(12) United States Patent
Sakuma

(10) Patent No.: US 10,178,265 B2
(45) Date of Patent: Jan. 8, 2019

(54) IMAGE FORMATION APPARATUS, METHOD OF CONTROLLING FLASH MEMORY, AND NON-TRANSITORY COMPUTER-READABLE STORAGE MEDIUM

(71) Applicant: Konica Minolta, Inc., Tokyo (JP)

(72) Inventor: Keishi Sakuma, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 33 days.

(21) Appl. No.: 14/674,881

(22) Filed: Mar. 31, 2015

(65) Prior Publication Data

US 2015/0288847 A1 Oct. 8, 2015

(30) Foreign Application Priority Data

Apr. 2, 2014 (JP) .................. 2014-075948

(51) Int. Cl.
*H04N 1/21* (2006.01)
(52) U.S. Cl.
CPC ... *H04N 1/2195* (2013.01); *H04N 2201/0094* (2013.01)
(58) Field of Classification Search
CPC .................................... H04N 1/2195
USPC ....................................... 358/1.16
See application file for complete search history.

(56) References Cited

U.S. PATENT DOCUMENTS

| 8,836,960 B1* | 9/2014 | Montierth | G06F 3/1211 |
| | | | 358/1.13 |
| 2003/0016389 A1* | 1/2003 | Miyaguchi | G06K 15/00 |
| | | | 358/1.16 |
| 2008/0062103 A1* | 3/2008 | You | G09G 3/3659 |
| | | | 345/89 |
| 2011/0109941 A1 | 5/2011 | Kasai et al. | |
| 2012/0198134 A1 | 8/2012 | Nakashita | |
| 2013/0114727 A1* | 5/2013 | Sato | H04N 19/00696 |
| | | | 375/240.16 |

FOREIGN PATENT DOCUMENTS

| JP | 2006-166222 A | 6/2006 |
| JP | 2010-108522 A | 5/2010 |
| JP | 2011-101994 A | 5/2011 |
| JP | 2012-133651 A | 7/2012 |
| JP | 2012-168937 A | 9/2012 |

OTHER PUBLICATIONS

Office Action in corresponding Japanese Patent Application No. 2014-075948 dated Mar. 29, 2016, with translation (6 pages).

* cited by examiner

*Primary Examiner* — Neil R McLean
*Assistant Examiner* — Darryl V Dottin
(74) *Attorney, Agent, or Firm* — Osha Liang LLP

(57) ABSTRACT

An image formation apparatus includes a flash memory as an image data buffer, and a control section, where data writing to each memory block of the flash memory is controlled by using wear leveling. The control section predicts whether writing of a certain amount of image data such that the amount of image data to be written into the flash memory in a predetermined period exceeds a predetermined value, will occur, and on predicting that the writing of the certain amount of image data will occur, restricting an input of image data and/or a speed of buffering the image data, to reduce the amount of image data to be written into the flash memory in the predetermined period.

21 Claims, 12 Drawing Sheets

FIG. 8A
RELATED ART

| LOGICAL ADDRESS | PHYSICAL ADDRESS | FREQUENCY OF DATA WRITING |
|---|---|---|
| FIXED DATA1 | FIXED DATA1 | 0 TIME |
| FIXED DATA2 | FIXED DATA2 | 0 TIME |
| FIXED DATA3 | FIXED DATA3 | 0 TIME |
| TEMPORARY DATA1 | TEMPORARY DATA1 | 1000 TIMES |
| TEMPORARY DATA2 | TEMPORARY DATA2 | 1000 TIMES |
| TEMPORARY DATA3 | TEMPORARY DATA3 | 1000 TIMES |
| TEMPORARY DATA4 | TEMPORARY DATA4 | 1000 TIMES |
| BLANK | BLANK | 1000 TIMES |
| BLANK | BLANK | 1000 TIMES |
| BLANK | BLANK | 1000 TIMES |

FIXED DATA REGION: FIXED DATA1–FIXED DATA3
BUFFER REGION: TEMPORARY DATA1–BLANK

IMAGE FORMATION APPARATUS, METHOD OF CONTROLLING FLASH MEMORY, AND NON-TRANSITORY COMPUTER-READABLE STORAGE MEDIUM

This application is based on Japanese Patent Application No. 2014-075948 filed on Apr. 2, 2014, in the Japan Patent Office, the entire content of which is hereby incorporated by reference.

TECHNICAL FIELD

Embodiments of the present invention relate to an image formation apparatus including a flash memory to which image data is written, a method of controlling the flash memory, and a non-transitory computer-readable storage medium storing a control program of the flash memory.

BACKGROUND

In recent years, flash memories are used as a storage medium in various apparatuses. Such flash memories have a characteristic that repeated data writing (including data rewriting) into the same block at short time intervals reduces a data retaining period of the block.

This characteristic will be described now. Generally, a flash memory is constituted by MOS (Metal Oxide Semiconductor) transistors (corresponding to memory cells), and each MOS transistor includes gate electrodes in a two-layer structure. There are two main types of flash memory, which are a NOR type flash memory and a NAND type flash memory. A NOR type flash memory can read, write, delete, and rewrite its content one byte at a time, since each cell is connected a source line and a bit line. A NAND type flash memory can read, write, delete, and rewrite its content plural bytes at a time, since plural cells are connected in series between a source line and a bit line. In both types, by applying a high electric field between a floating gate of a MOS transistor and a silicon substrate, electrons pass through a gate insulating film with a tunneling effect and are injected into the floating gate, which changes the gate voltage (threshold voltage) at which the MOS transistor is switched from OFF state to ON state. The both types of flash memory store information in itself using this feature.

Accordingly, the increased number of times of writing data into a flash memory causes deterioration of the gate insulating film because of tunnel injection of electrons. Therefore, electrons injected into the floating gate tend to run into the silicon substrate more, and thus the data retention period is shortened. In particular, a NAND type flash memory carries out data writing on one whole memory block at a time even for writing data into a part of cells in a memory block (hereafter referred to as "a block"). It substantially increases the number of times of data writing in the flash memory, and deterioration of the gate insulating film worsens, and thus the data retention period is shortened.

Due to the above circumstances, data writing into flash memories are controlled by using a wear leveling function such that data writing is not concentrated onto the same block. The wear leveling function records a writing history for each block of the flash memory, and performs data writing onto the blocks evenly by referring to the history.

With respect to such techniques for diversifying data writing, for example, Japanese Unexamined Patent Publication (JP-A) No. 2010-108522 discloses a method of controlling a memory system including a nonvolatile memory having a plurality of blocks, wherein data erasing is performed in a unit of one block. The method includes: a step of measuring erasure time when data in each block is erased; and a step of writing at least data supplied from the outside into a first block which is vacant and whose erasure time is the oldest.

The wear leveling function can restrict repeated data writing into the same block. However, when the amount of data to be written into the flash memory is so large, data writing is frequently performed in the flash memory, and data writing can be performed repeatedly within a short period of time in several blocks even if the wear leveling works. Since deterioration of the gate insulating film advances in a block into which data writing is carried out repeatedly within a short period of time, the data retention period of such a block is shortened, and thus the life of the flash memory is shortened.

In addition, even if data is preferentially written into a block whose erasure time is the oldest using the technique of JP-A No. 2010-108522, that block merely has erasure time that is relatively old as compared to other blocks, and thus absolute erasure time may not be old. It can causes a situation that the sufficient time interval from when data is written into each block until when next data is written into the corresponding block is hardly secured. Such a situation worsens a deterioration of the gate insulating film of the block, and shorten the data retention period and the life of the flash memory.

Such issues arise in any apparatus that writes data into a flash memory. In particular, in image formation apparatuses that use a flash memory as an image data buffer, writing of image data having large size is repeatedly carried out within a short period of time, and those issues become conspicuous in the apparatuses.

SUMMARY

One or more embodiments of the invention illustrate image formation apparatuses, methods of controlling a flash memory, and non-transitory computer-readable storage media each storing a control program of a flash memory.

An illustrative image formation apparatus reflecting one or more embodiments of the present invention is an image formation apparatus comprising: a flash memory to be used as an image data buffer and a control section for controlling the flash memory, where the flash memory includes a plurality of memory blocks, and data writing to each of the memory blocks is controlled by using wear leveling. The control section performs processes including: predicting whether or not writing of a certain amount of image data such that the amount of image data to be written into the flash memory in a predetermined period of time exceeds a predetermined value, will occur; and on predicting that the writing of the certain amount of image data will occur, restricting at least one of an input of image data and a speed of buffering the image data to the flash memory, to reduce the amount of image data to be written into the flash memory in the predetermined period of time to the predetermined value or less.

An illustrative method of controlling a flash memory reflecting one or more embodiments of the present invention is a method of controlling a flash memory for use as an image data buffer in an image formation apparatus. The flash memory includes a plurality of memory blocks, where data writing to each of the memory blocks is controlled by using wear leveling. The method comprises: predicting whether or not writing of a certain amount of image data such that the amount of image data to be written into the flash memory in a predetermined period of time exceeds a predetermined value, will occur; and on predicting that the writing of the certain amount of image data will occur, restricting at least one of an input of image data and a speed of buffering the image data to the flash memory, to reduce the amount of image data to be written into the flash memory in the predetermined period of time to the predetermined value or less.

An illustrative non-transitory computer-readable storage medium reflecting one or more embodiments of the present invention stores a control program of a flash memory to be executed in an image formation apparatus. The flash memory is used as an image data buffer in the image formation apparatus and including a plurality of memory blocks, where data writing to each of the memory blocks is controlled by using wear leveling. The control program, when being executed by a processor of the image formation apparatus, causes the processor to perform processes comprising: predicting whether or not writing of a certain amount of image data such that the amount of image data to be written into the flash memory in a predetermined period of time exceeds a predetermined value, will occur; and on predicting that the writing of the certain amount of image data will occur, restricting at least one of an input of image data and a speed of buffering the image data to the flash memory, to reduce the amount of image data to be written into the flash memory in the predetermined period of time to the predetermined value or less.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 8A to 8C depict a specific example of a control of data writing by using wear leveling;

DETAILED DESCRIPTION

Figure 1:
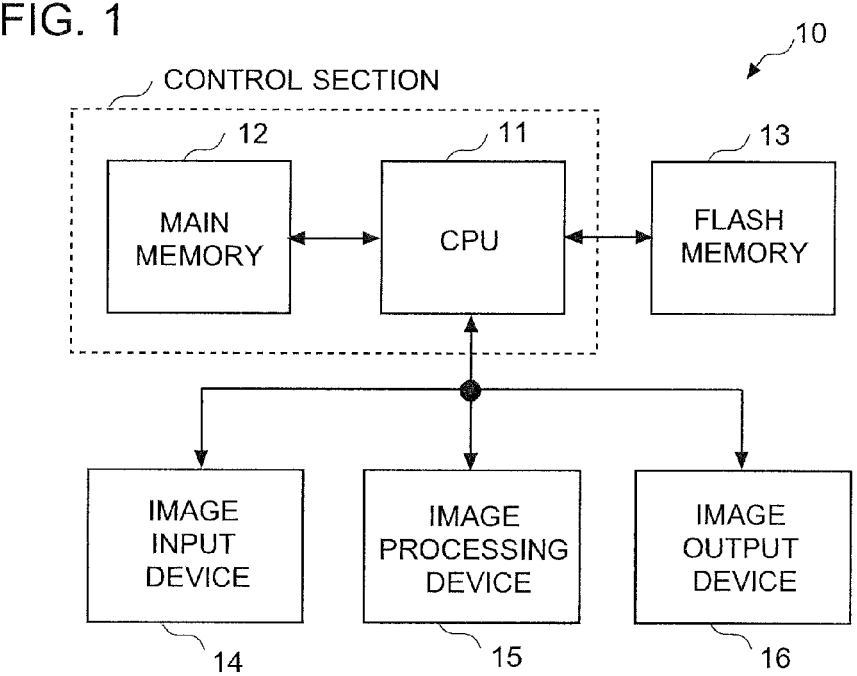
FIG. 1 depicts a block diagram illustrating a schematic structure of an image formation apparatus according to an example of one or more embodiments of the present invention.

Embodiments of image formation apparatuses, methods of controlling a flash memory, and non-transitory computer-readable storage media each storing a control program of a flash memory will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to one or more embodiments of the image formation apparatuses, methods of controlling a flash memory and non-transitory computer-readable storage media each storing a control program of a flash memory, it makes possible to restrict shortening of the data retention period of all blocks in a flash memory in which data writing is controlled by a wear leveling function, and extend the life of the flash memory.

The reason is as follows. The control section of the image formation apparatus calculates the amount of image data to be written into a flash memory in a predetermined period of time, and predicts an occurrence of a data-writing overload state of the flash memory by determining whether or not the calculated amount of the image data to be written into the predetermined period will exceed a predetermined value. If the control section has predicted an occurrence of the data-writing overload state, the control section restricts an input of image data (or obtaining the input image data) and/or a speed of buffering the input image data to the flash memory, to reduce the amount of image data to be written into the flash memory in the predetermined period of time to the predetermined value or less.

As described in the descriptions of the background, a flash memory, in its data writing operations, is controlled using a wear leveling function such that the data writing operations are not concentrated on the same block. However, if input data volume is so large, the control causes repeated data writing within a short period of time in several blocks, which worsen a deterioration of the gate insulating film of those blocks and results in a reduction of the data retention period. In addition, even if the flash memory is controlled such that data is written into a block whose erasure time is the oldest by using the technique of JP-A No. 2010-108522, such a control can also cause repeated data writing within a short period of time in several blocks, which worsen a deterioration of the gate insulating film of those blocks and results in a reduction of the data retention period, too.

In other words, in a flash memory even if the wear leveling function works, the time period from when data is written into a block until when next data is written into the block is shortened, and the data retention period is shortened. With respect to this issue, there can be provided a method to compare an interval of data writing into each block and the predetermined threshold and to control the flash memory such that the interval of data writing into each block does not become shorter than the threshold in every block. However, in this method, it is necessary to manage the data writing history for each block and thus the control is complicated. In addition, for making the interval of data writing in all blocks shorter than the threshold, it is necessary to restrict data input. In computing devices configured to process input data with programs and output the processed data, it is generally difficult to adjust data input itself. A restriction of the data input can make any trouble in operations of such computing device.

On the other hand, in image formation apparatuses using a flash memory as a buffer of image data, the size of input image data and the number of pieces of input image data can be predicted. Accordingly, it is possible to control data writing into the flash memory so that the data writing interval becomes shorter than a threshold in all blocks, without managing the data writing history of each block. Further, in image formation apparatuses, image data input from a mechanical unit, such as a scanner, is temporarily maintained in a flash memory and is output to another mechanical unit, such as a print engine. Accordingly, when the amount of input image data is so large, the amount of the input image data may be adjusted by controlling the operating conditions of those mechanical units.

In one or more embodiments of the present invention, such characteristics of an image formation apparatus are taken into consideration, and there is provided the following image formation apparatus which uses a flash memory as a buffer of image data and conducts a control to reduce a data-writing load of the flash memory. On buffering image data into the flash memory, the image formation apparatus calculates the amount of image data to be written into the flash memory within a predetermined period of time (for example, an interval of data writing into the flash memory, which is necessary to maintain a sufficient data retention period of each block of the flash memory), and predicts an occurrence of a data-writing overload state of the flash memory by determining whether or not the calculated amount of image data will exceed a predetermined value (for example, the storage capacity of the flash memory). If it has been predicted that the flash memory will become overloaded with data writing, the image formation apparatus restricts an input of image data and/or a speed of buffering the input image data to the flash memory by changing an operation condition of a mechanical unit so as to reduce the accumulated amount of data written into the flash memory within the predetermined period to a predetermined value or less.

Thereby, the data writing interval can be a predetermined period or more for all the blocks in the flash memory, the data retention period of each block can be improved, and the life of the flash memory can be prolonged.

EXAMPLE

Figure 2:
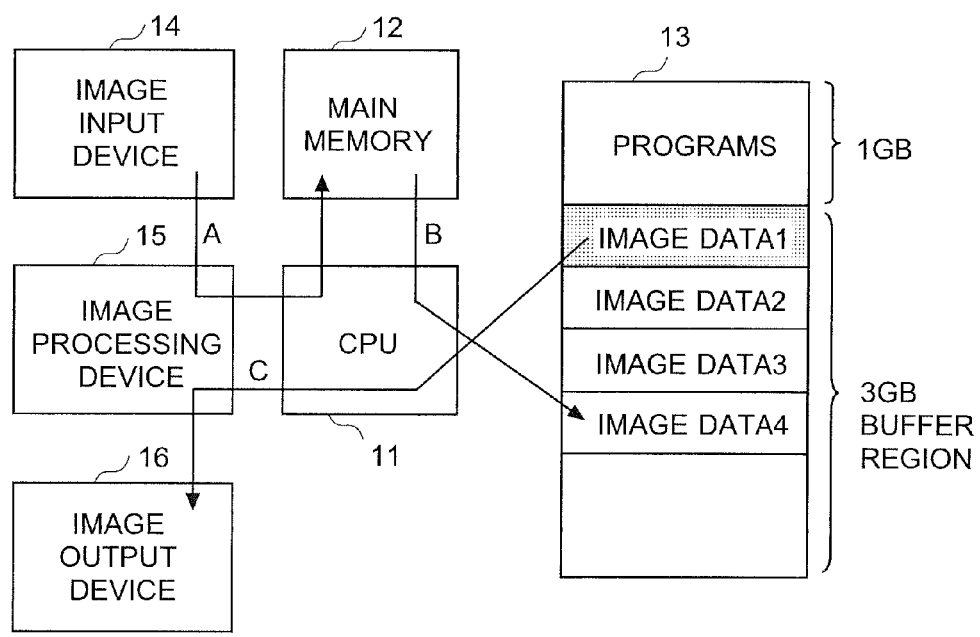
FIG. 2 depicts a diagram illustrating data buffering control in an image formation apparatus according to an example of one or more embodiments of the present invention.
Figure 3:
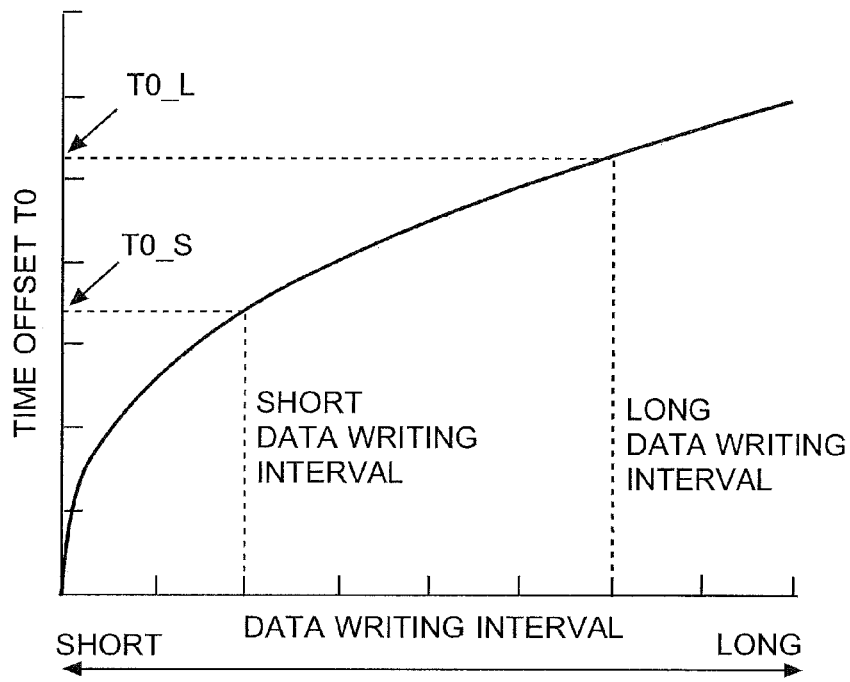
FIG. 3 depicts a diagram illustrating characteristics of a flash memory (dependence of the interval from immediately after data writing until when the threshold voltage of the transistor starts to change upon the data writing interval)
Figure 4:
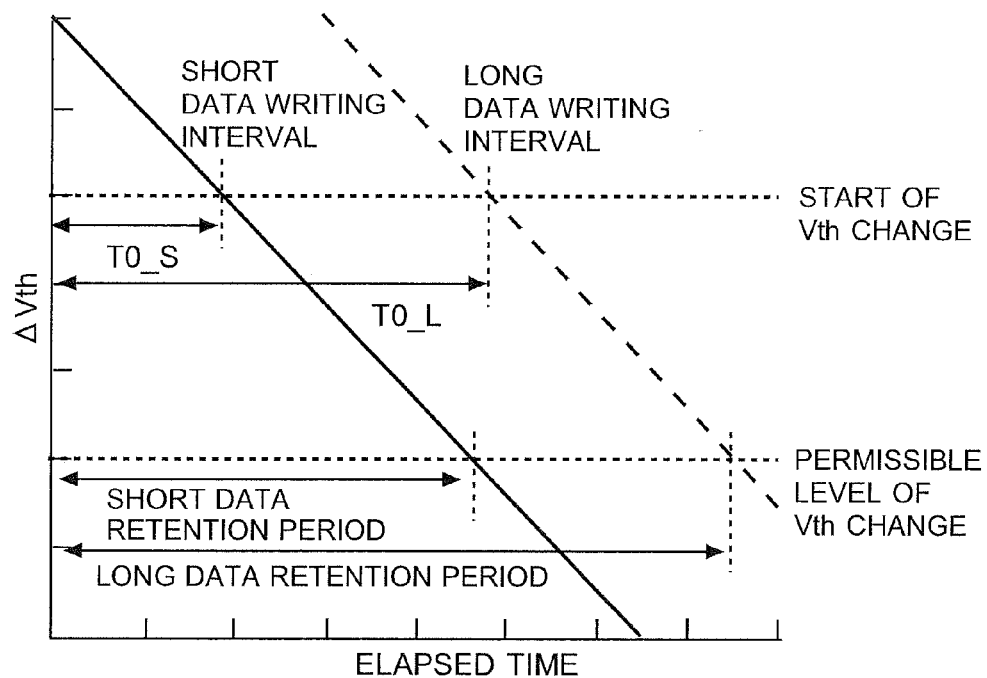
FIG. 4 depicts a diagram showing characteristics of the flash memory (dependence of the threshold voltage of the transistor upon the elapsed time)
Figure 5:
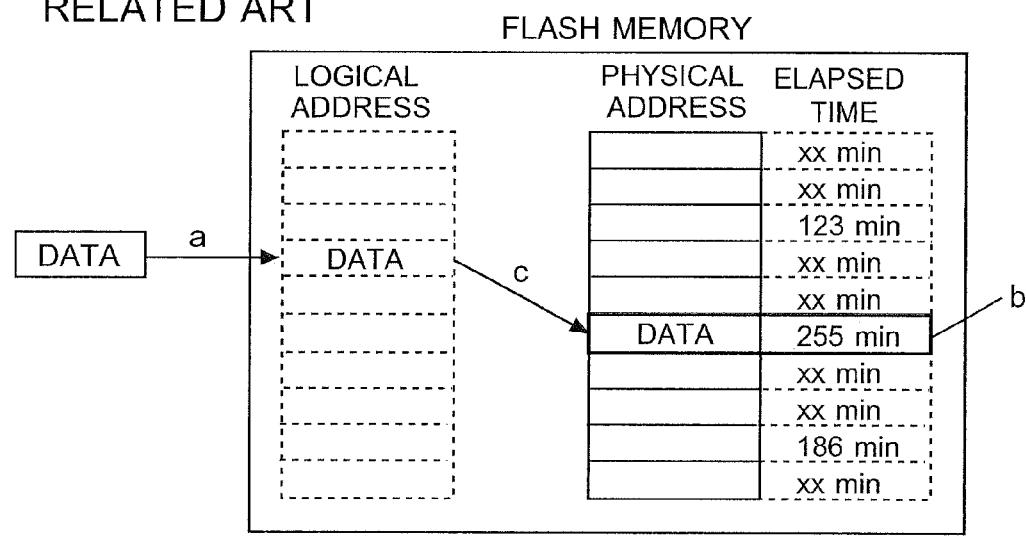
FIG. 5 depicts a diagram illustrating a control of writing data into blocks by using wear leveling.
Figure 6:
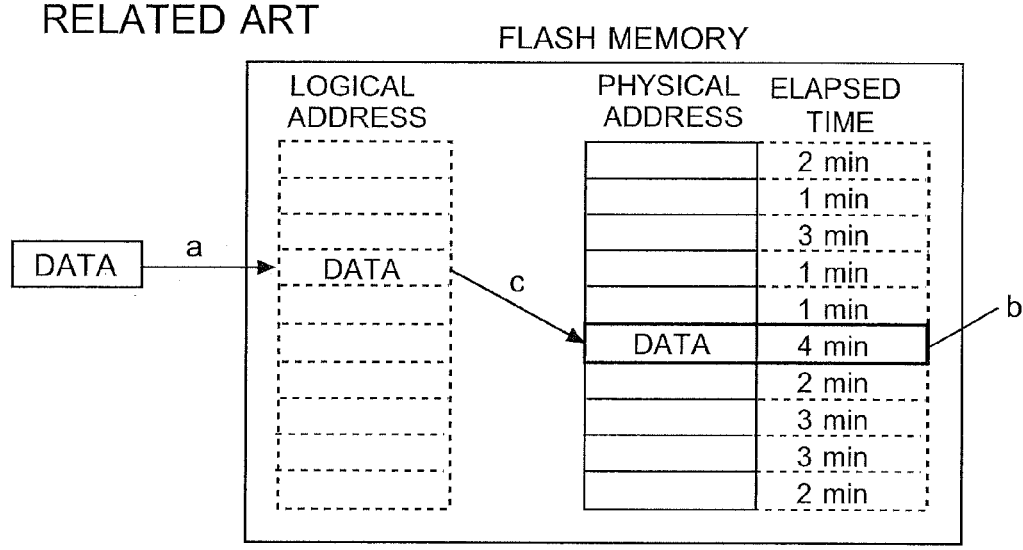
FIG. 6 depicts a diagram illustrating a control of writing data into blocks by using wear leveling (under the situation that sufficient data writing interval is hardly secured)
Figure 7A:
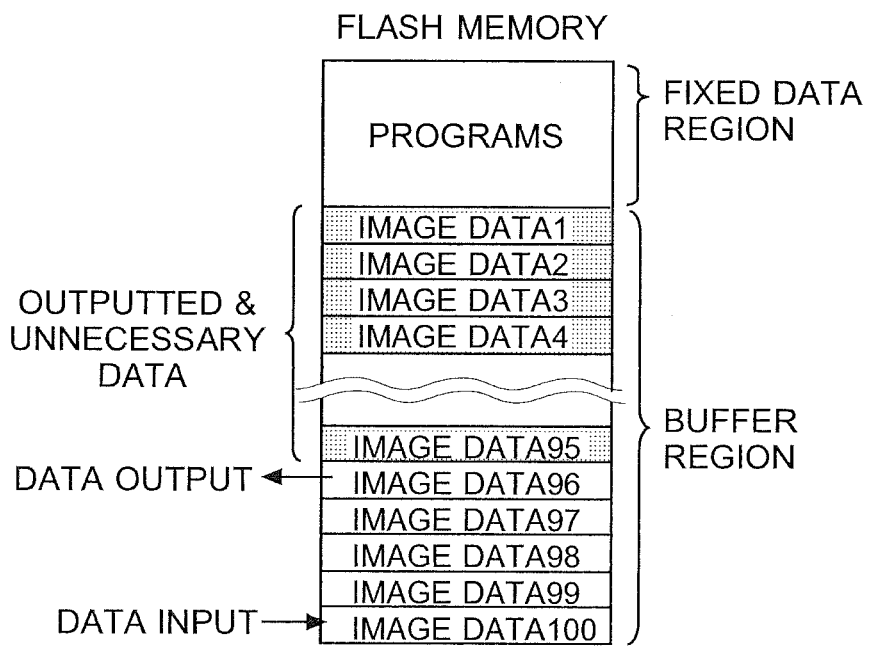
FIGS. 7A and 7B depict diagrams illustrating a specific example of buffering control of image data.
Figure 7B:
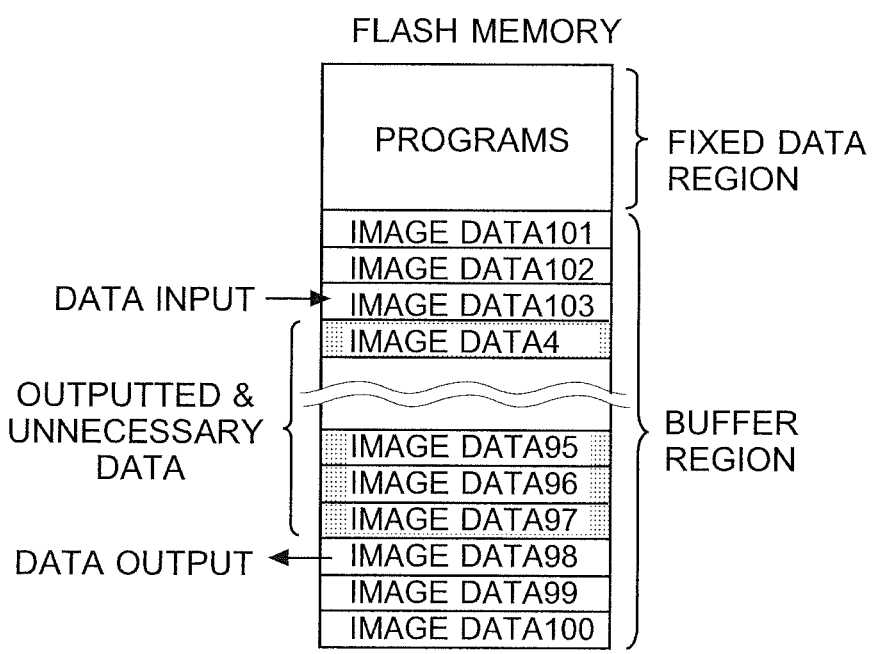
Figure 8B:
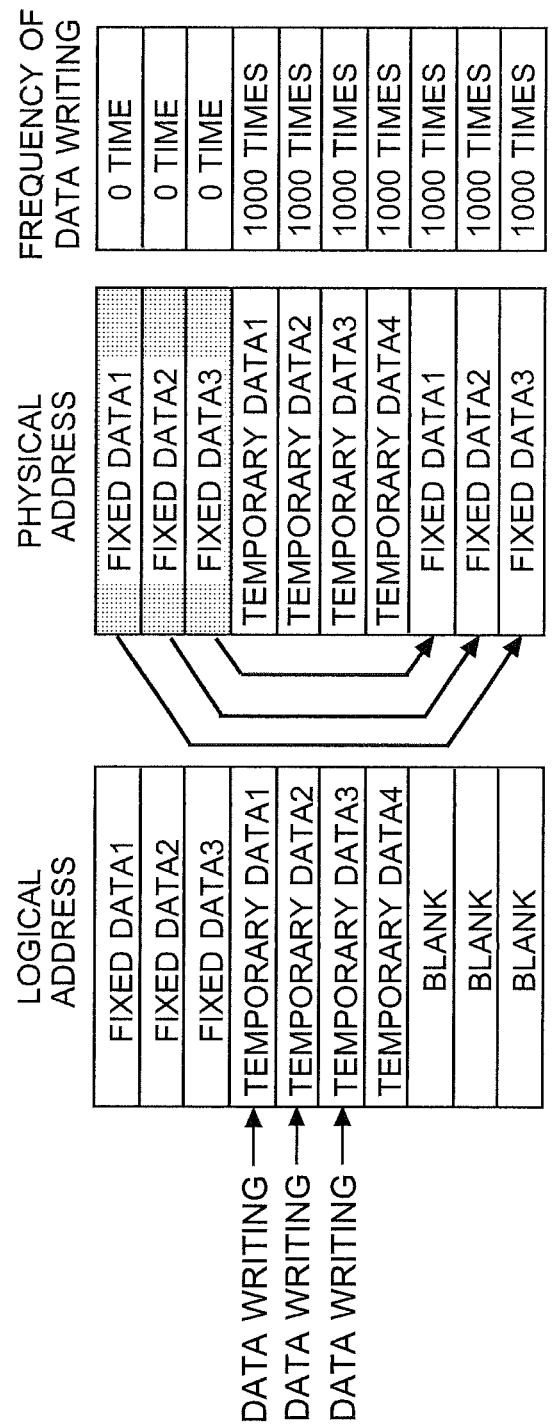
Figure 8C:
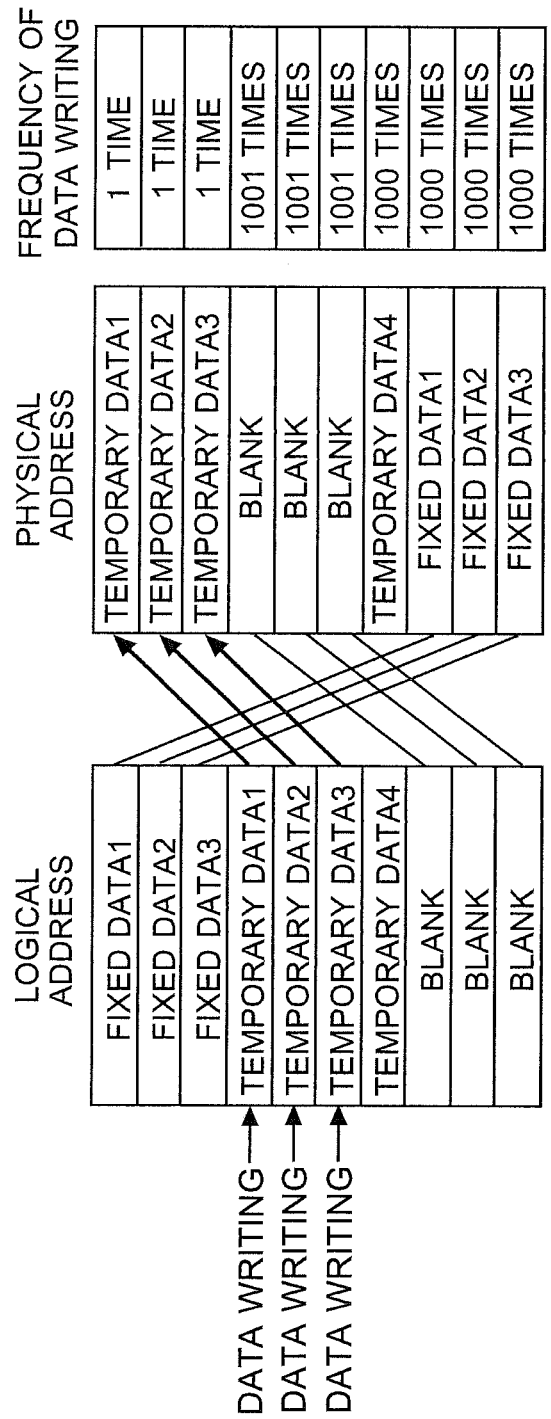
Figure 9A:
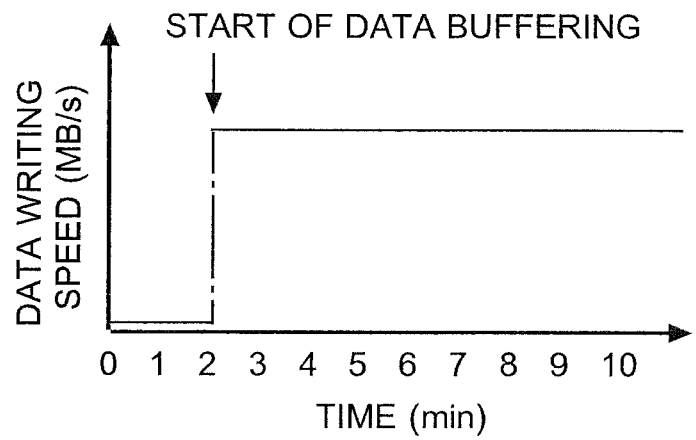
FIGS. 9A and 9B depict an example of a method of predicting a data-writing overload state of a flash memory by monitoring a data bus of the flash memory, according to an example of one or more embodiments of the present invention.
Figure 9B:
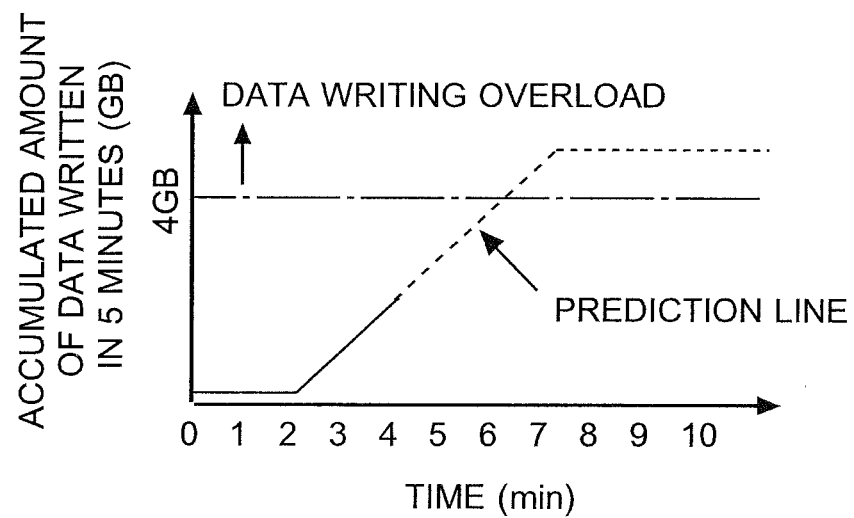
Figure 12:
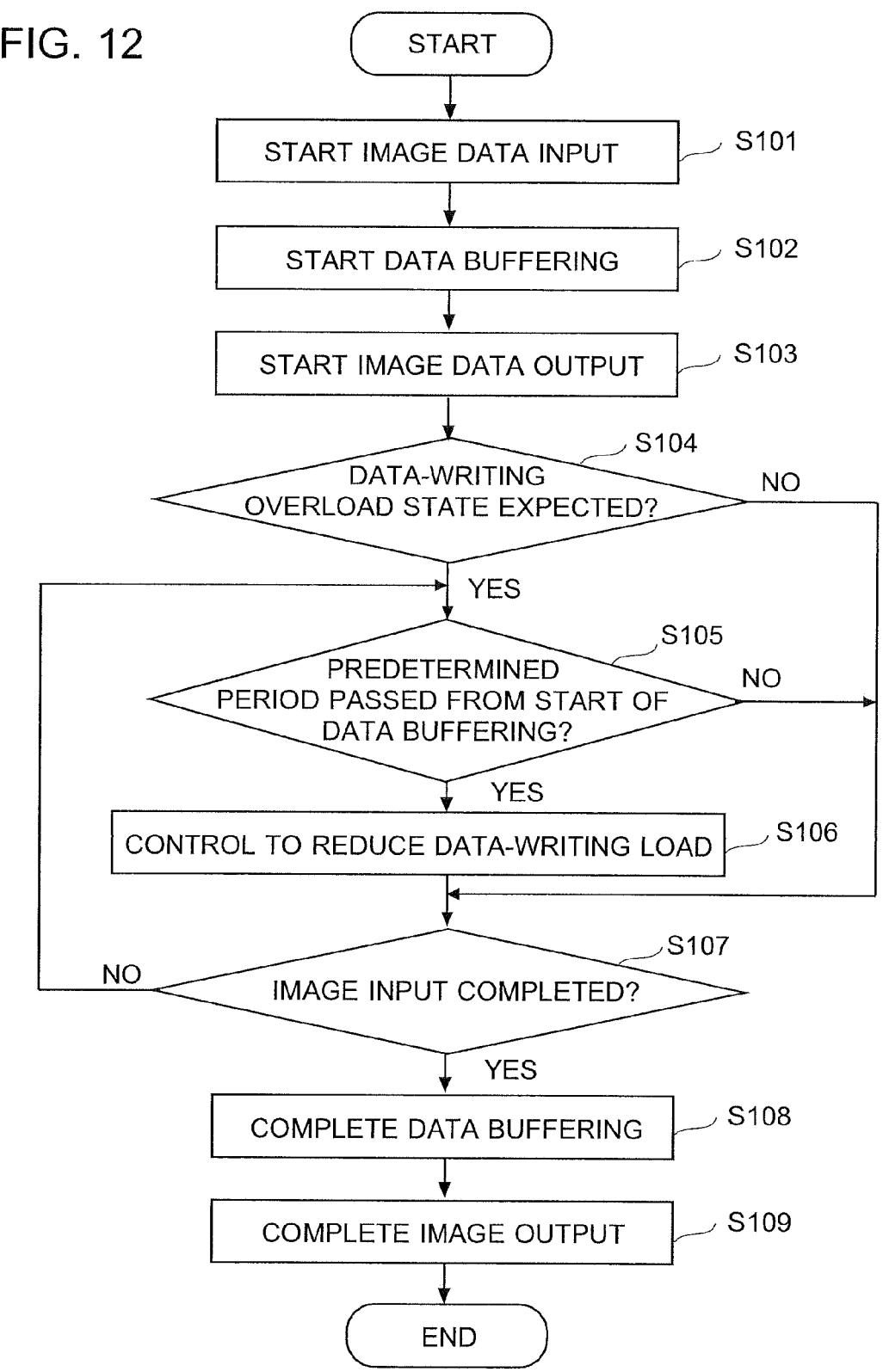
FIG. 12 depicts a flowchart illustrating operations of an image formation apparatus according to an example of one or more embodiments of the present invention.
Figure 13:
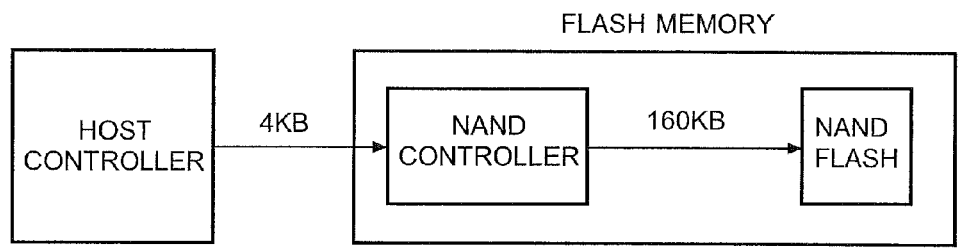
FIG. 13 depicts a diagram illustrating a W/A factor of a flash memory according to one or more embodiments.
Figure 14:
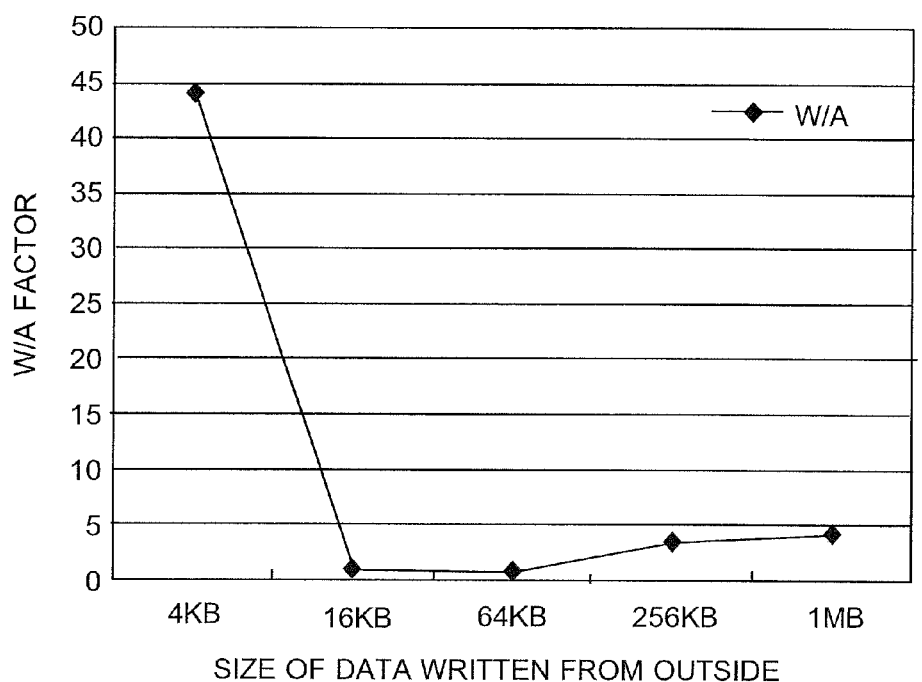
FIG. 14 depicts a diagram illustrating a measurement result of characteristics of a flash memory (dependence of the W/A factor upon the transmission data size) according to one or more embodiments.

For the purpose of describing the above-described embodiments of the present invention in more detail, an illustrative image formation apparatus and an illustrative method of controlling a flash memory will be described now with reference to FIGS. 1 to 14. FIG. 1 depicts a block diagram illustrating a schematic structure of the image formation apparatus according to the present example. FIG. 2 depicts a diagram illustrating data buffering control in the image formation apparatus according to the present example. FIG. 3 and FIG. 4 depict diagrams illustrating characteristics of a flash memory. FIG. 5 and FIG. 6 depict diagrams illustrating a control of writing data into blocks by using wear leveling. FIGS. 7A and 7B depict diagrams illustrating a specific example of data buffering control. FIGS. 8A to 8C depict diagrams illustrating a specific example of a control of data writing by using wear leveling. FIGS. 9A and 9B depict diagrams illustrating an example of the method of predicting a data-writing overload state of a flash memory by monitoring a data bus of the flash memory, according to the present example. FIGS. 10A to 10C and FIGS. 11A to 11C depict diagrams illustrating examples of a control to reduce the data-writing load of the flash memory according to the present example. FIG. 12 is a flowchart illustrating operations of the image formation apparatus according to the present example. FIG. 13 depicts a diagram illustrating a W/A factor of a flash memory. FIG. 14 depicts a diagram illustrating a measurement result of characteristics of a flash memory (dependence of the W/A factor on the transmission data size). In the following description, "data writing into a flash memory" or "writing of data into a flash memory" represents a case where data maintained in a block is rewritten with other data in addition to a case where data is written into a block that does not currently maintain data.

Hereafter, in the present example, an image formation apparatus is used as an example of an apparatus including a flash memory. As illustrated in FIG. 1, the image formation apparatus 10 according to the present example includes a CPU (Central Processing Unit) 11, a main memory 12, a flash memory 13, an image input device 14, an image processing device 15, and an image output device 16, for example. It should be noted that the image input device 14 and/or the image output device 16 may be included inside the image formation apparatus 10 (in that case, they are referred to as an image input section and an image output section), or may be separated from the image formation apparatus 10 so as to be connected to the image formation apparatus 10 by a wired or wireless communication.

A control section is constituted by the CPU 11 and the main memory 12. The control section conducts a control of the overall image formation apparatus 10 and a control of components according to various operation modes. In addition, the control section includes a flash-memory controller and controls reading/writing of data, erasure and rewriting of data (these are collectively referred to as "data writing" or "writing of data") performed onto the flash memory 13. Specifically, the flash-memory controller receives image data which has been input from the image input device 14 and processed in the image processing device 15 as occasion demands, and stores the input image data into a main memory 12 once. The flash-memory controller further writes the image data to each block of the flash memory 13 by using wear leveling, reads the image data from the flash memory 13, and outputs the image data to the image output device 15.

The flash-memory controller includes a function of calculating the amount of image data to be written into the flash memory 13 in a predetermined period of time (referred to as "accumulated amount of written data" or "accumulated amount of data written into a flash memory") and predicting whether or not a data-writing overload state the flash memory 13 will occur by determining whether the accumulated amount of written data will exceed a predetermined value. In other words, the flash-memory controller predicts whether or not writing of a certain amount of image data such that the amount of image data to be written into the flash memory 13 in a predetermined period of time exceeds a predetermined value, will occur. The flash-memory controller further includes a function of performing a control of, on predicting that the flash memory 13 will become in the data-writing overload state, restricting an input of image data and/or a speed of buffering the input image data to the flash memory 13 (referred to as "a control to reduce the data-writing load") by, for example, changing an operating condition of a mechanical unit of the image input device 14 or another device. It should be noted that the above-described predetermined period can be an interval of data writing to the flash memory 13 necessary to maintain a sufficient data retention period of each block of the flash memory 13. Specifically, the above-described predetermined period can be defined, for example, so as to increase a data retention period of each block which makes the life of the flash memory 13 not less than the level of life of the image formation apparatus 10. In addition, the above-described predetermined value can be, for example, the storage capacity of the flash memory 13.

The flash memory 13 is a nonvolatile memory of NOR type or NAND type in which data can be read/written, erased and rewritten. The flash memory 13 serves as a buffer memory that maintains image data, which has been input from the image input device 14 and processed in the image processing device 15 as occasion demands, according to instructions of the control section, and that outputs the maintained image data to the image output device 16 according to the instructions of the control section. In addition, the flash memory 13 stores programs to be executed by the CPU 11.

The image input device 14 can include, for example, a scanner. The image input device 14 scans an original image placed on a platen and outputs the image data thus read optically to the image processing device 15 (when image processing is unnecessary, the image is stored in the flash memory 13 via a main memory 12 according to the instructions of the control section). In so doing, the image input device 14 performs image data input processing in a high speed operation mode in which an increased amount of image data is input (the data size is made large), or a low speed operation mode in which a decreased amount of image data is input (the data size is made small) according to the instructions of the control section.

If needed, the image processing device 15 performs image processing such as edge enhancement processing, smoothing processing, color conversion processing to the image data transmitted from the image input device 14. In addition, when acquiring print data described in a PDL (Page Description Language) represented by PostScript and PCL (Printer Control Language) from another apparatus, the image processing device 15 rasterizes each page included in the print data to generate image data for each page and performs the image processing onto the generated image data, if needed. Then, the image data that had undergone image processing is stored in the flash memory 13 via the main memory 12 according to the instructions of the control section.

The image output device 16 can include, for example, a print engine, and performs print processing onto paper using the image data stored in the flash memory 13. In so doing, the image output device 16 performs output processing of the image data in a high speed operation mode in which an increased amount of image data is processed (the data size is made large), or a low speed operation mode in which a reduced amount of image data is processed (the data size is made small) according to the instructions of the control section. Specifically, an electrophotography system forms an electrostatic latent image by irradiating light corresponding to the image from an exposure device onto a photoconductor drum electrified by an electrification device; develops the electrified toner by adhering the toner in a developer device; performs a primary transfer of the toner image onto a transfer belt; performs a secondary transfer from the transfer belt onto the paper; and fixes the toner image on the paper by a fixing device.

When input of image data is carried out in an image formation apparatus shown in FIG. 1 by an operation such as scanning and copying, the image forming apparatus generally performs control of data buffering as illustrated in FIG. 2.

First, the image processing device 15 performs image processing onto the image data acquired by the image input device 14 and then stores the image data in the main memory 12 (refer to "A" in FIG. 2). Next, the image data on the main memory 12 is buffered in the flash memory 13 (refer to "B" in FIG. 2). Immediately after the image output device 16 becomes ready to receive the buffered image data, the image data is read from the flash memory 13 and outputted to the image output device 16 (refer to "C" in FIG. 2).

Such control of buffering data into the flash memory 13 is carried out for the following reasons. Under the condition that there is a difference between the data transfer rate of the image input device 14 and that of the image output device 16, and in particular, the condition that the data transfer rate of the image input device 14 is faster than that of the image output device 16, it is necessary to buffer the input image data to some kind of memory. Under another condition that the image input device 14 performs continuous data input and the image output device 16 performs intermittent data output, it is necessary to buffer the input image data to some kind of memory, too. Generally, most of apparatuses as illustrated in FIG. 1 use, for example, DRAM (Dynamic Random Access Memory) as the main memory 12. However, the bit unit price of a DRAM is high as compared with an HDD (Hard Disk Drive) or a flash memory 13. Therefore, DRAMs are not suitable for temporarily storing mass data like image data. Accordingly, for the purpose of reducing cost, image data is buffered into a HDD or a flash memory 13 other than the main memory 12.

Next, the above-described issues upon buffering data to the flash memory 13 will be described with reference to FIG. 3 and FIG. 4. FIG. 3 illustrates a dependence of the interval (described as "time offset T0") from immediately after data writing until when the threshold voltage of the transistor starts to change upon the data writing interval, for each cell of each block constituting the flash memory 13. FIG. 4 illustrates a dependence of the threshold voltage (described as "$\Delta V_{th}$") of a transistor constituting each cell upon the elapsed time.

As shown in FIG. 3 and FIG. 4, a long interval of data writing makes the speed of deterioration of the gate insulating film slow, and thus elongates a time period until the threshold voltage of the transistor starts changing (for example, T0_L in FIG. 3). As a result, the data retention period (so-called data retention) determined according to the permissible level of change of the threshold voltage can be longer. Meanwhile, since the deterioration of the gate insulating film worsen more as the data writing interval is shorter, the period until the threshold voltage of the transistor starts changing becomes shorter (for example, T0_S in FIG. 3). As a result, the data retention period determined according to the permissible level of change of the threshold voltage is shortened.

As described above, under the condition that data writing is continually performed within a short time period to any block of the flash memory 13 constituted by a plurality of blocks, such condition shortens the retention period of data stored in the block and thus shortens the life of the entire flash memory 13. In view of this issue, the flash memory 13 is usually controlled so that data writing is not concentrated to the same block using a wear leveling function. Under the situation that the control of data buffering illustrated in FIG. 2 is continued, such a situation can result in the shorten interval of data writing into any one of the blocks in spite of a use of wear leveling, and thus the data retention period of data stored in the block can be reduced.

This issue is now described in detail with reference to FIG. 5 and FIG. 6. FIG. 5 and FIG. 6 depict diagrams illustrating a control of writing data into the blocks using wear leveling. For example, as illustrated in FIG. 5, upon writing data into a flash memory, a logical address is specified as a writing destination address in response to a data writing request (refer to "a" in FIG. 5) from the outside of the flash memory. In the flash memory, physical addresses are associated with logical addresses one by one. At this time, in the flash memory, the wear leveling function selects a physical address associated with the specified logical address (refer to "b" in FIG. 5) and writes data at the physical address (refer to "c" in FIG. 5).

Upon selecting the physical address, the wear leveling function selects a block with the longest elapsed time from the last writing among the blocks in the flash memory, and selects a physical address corresponding to the selected block. That is, in response to the data writing request from the outside of the flash memory, data writing inside the flash memory is performed onto the block with the longest elapsed time from the last writing, whichever logical address the request specifies. This control restricts continual data writing to the same block during a short period of time.

However, as illustrated in FIG. 6, if data writing is requested from the outside under the condition that sufficient time is not elapsed from the last writing for all blocks, elapsed time is insufficient even in the block with the longest elapsed time from the last writing. Accordingly, the data writing interval of any of the blocks becomes short even if the wear leveling function works and thus the data retention period of data stored in that block is shortened.

The cause of a case where sufficient writing interval cannot be secured will be described now. For example, it is assumed that an image formation apparatus uses a flash memory whose storage capacity is 4 GB, and that the interval of data writing (referred to as "recommended writing interval") is set to 5 minutes, where the interval of data writing is that necessary to make data written in each block in the flash memory have a sufficient data retention period (for example, to prolong the life of the flash memory to the same level as the life of the image formation apparatus or more).

The elapsed time from the last writing of the block in the flash memory is 1 to 4 minutes in the state in FIG. 6. Accordingly, if data writing occurs in this state, writing interval of 5 or more minutes, which is a recommended writing interval, cannot be secured in any block, and thus the data retention period is shortened. When data writing has occurred onto all the blocks in the flash memory 13 in the past within 5 minutes, the elapsed time from the last data writing is no greater than 5 minutes in every data block. That is, such a situation arises when writing of data of which the amount is the same as the storage capacity of the flash memory (here, 4 GB) or more has occurred within 5 minutes (this state is referred to as "data-writing overload state").

This will be described now using the image formation apparatus that buffers image data into the flash memory as an example. As illustrated in FIG. 7A, the image formation apparatus repeatedly performs buffering of the image data and sequential read-out of the buffered image data. When image data of which the amount exceeds the capacity of the buffer region previously provided on the flash memory, is input into the flash memory, an excess of the input image data is written so as to overwrite existing data at a certain address (physical address) in the flash memory, as illustrated in FIG. 7B, where output of the existing data at the address has already been completed and the data becomes unnecessary.

For example, obtaining input image data, such as copying and scanning, is performed intermittently in an image formation apparatus, and the image formation apparatus performs continual control to buffer the input image data to a flash memory (data buffering control) as illustrated in FIGS. 7A and 7B. Such control easily causes data writing of which the data amount exceeds the storage capacity of the flash memory, within a short period in time, and the flash memory comes into a data-writing overload state. Data buffering control succeeding after the flash memory comes into the state, shortens the interval of data writing in any one of the blocks in the flash memory, and thus the data retention period is shortened.

Such a shortened data retention period can incur a risk of causing any trouble in operations of the image formation apparatus in addition to the image data being disappeared. For example, it is assumed that there are prepared a fixed data region for storing important data, such as programs, and a buffer region for temporary storing data in a flash memory, as shown in FIGS. 7A and 7B, and data writing to the buffer region causes a data-writing overload state of the flash memory. At this time, which data is written and to which block is written are determined by control of wear leveling provided in the flash memory in advance. In this case, all the blocks and all data in the flash memory may be a writing target.

Wear leveling is generally performed onto all the blocks in the flash memory. Therefore, even if data is written only into the buffer region, data in the fixed data region can be replaced with the written data by replacement processing as illustrated in FIG. 8A to 8C, where the replacement processing aims at varying the number of times of data writing to each block from the others. Accordingly, under the situation that data in the fixed data region is replaced with written data in data writing operations performed after the flash memory has reached the data-writing overload state, such the situation shorten the data retention period of the replaced data. In particular, when the replaced data is important data such as a program, the data buffering control onto the flash memory can incur a big risk of causing fatal errors in the system.

This will be described in detail. As illustrated in FIG. 8A, if data is written only in the buffer region, there is bias in the number of times of data writing (frequency of data writing) among the blocks. When the bias in the number of times of data writing becomes large, the wear leveling function performs data replacement processing for reducing such bias. First, as illustrated in FIG. 8B, when data writing into the buffer region occurs, fixed data in the fixed data region is moved to a blank region in the buffer region. Then, as illustrated in FIG. 8C, after erasing the data in the fixed data region where the fixed data has been stored originally, the data is written into the fixed data region. As a result of the series of operations of the replacement processing, the fixed data, which is important data, is stored in the buffer region where data writing occurs frequently. Accordingly, the retention period of the fixed data is shortened, and thus a fatal error can be caused in the image formation apparatus in case that the fixed data has been erased or cannot be read.

In order to avoid such a risk, the control section of the image formation apparatus of the present example, when writing data into the flash memory, predicts in advance whether a data-writing overload state of the flash memory will occur, and performs control to reduce the data-writing load of the flash memory in response to predicting that the data-writing overload state will occur. Specifically, under the assumption that the interval of data writing that can sufficiently maintain the data retention period of each block of the flash memory (recommended writing interval) is 5 minutes and the storage capacity of the flash memory is 4 GB, the flash memory can be in the data-writing overload state, for example, when writing of data over 4 GB is caused in the past 5 minutes. The control section of the image formation apparatus of the present example predicts in advance an occurrence of the data-writing overload state using the above-described recommended writing interval and the storage capacity of the flash memory. Examples of the method of predicting the occurrence of the data-writing overload state in advance include the followings.

First Prediction Method:

The first prediction method is a method of monitoring the data bus of the flash memory. For example, as illustrated in FIG. 9A, when carrying out a control of buffering image data, the data writing speed to the flash memory 13 (this may be the average speed in a predetermined period or the maximum speed in a predetermined period) is measured. Then, based on the data writing speed, the control section calculates the accumulated amount of data written in 5 minutes (i.e., the total amount of data written in blocks that do not reach the recommended writing interval). Then, as illustrated in FIG. 9B, if the accumulated amount of data written in 5 minutes thus calculated exceeds 4 GB, which is the storage capacity of the flash memory, it is possible to predict that the flash memory will reach the data-writing overload state after continuing data buffering at the given data writing speed.

Second Prediction Method:

The second prediction method is a prediction method based on the operation mode in obtaining input images. For example, if the size of image data input (obtained) from the image input device 14 of the image formation apparatus can be determined by the operation mode of the image input device 14 or the type of input images, a table as shown in Table 1 is created in advance. Specifically, the control section of the image formation apparatus obtains the size of input image data on the basis of the scan resolution and the scanning size, obtains the amount of the data written into the flash memory per unit time on the basis of the size of the input image data and scanner productivity (ppm: page per minute), and calculates the accumulated amount of data written into the flash memory in 5 minutes from the data amount written in to the flash memory per unit time. Then, if the accumulated amount of written data exceeds the storage capacity of the flash memory (4 GB), the control section determines an occurrence of the data-writing overload state of the flash memory 13. In patterns in Table 1, it is possible to predict that the data-writing overload state of the flash memory will occur in operation modes of No. 2, 4 and 6.

TABLE 1

| No. | Operation mode of image input | | Size of image data | Scanner productivity (image input speed) | Accumulated amount of data written in 5 minutes | Data-writing load |
|---|---|---|---|---|---|---|
| 1 | 300 dpi | A4 | 12.5 MB | 40 ppm | 2.44 GB | — |
| 2 | | A3 | 25 MB | | 4.88 GB | Overload |
| 3 | 600 dpi | A4 | 25 MB | 20 ppm | 2.44 GB | — |
| 4 | | A3 | 50 MB | | 4.88 GB | Overload |
| 5 | 1200 dpi | A4 | 50 MB | 10 ppm | 2.44 GB | — |
| 6 | | A3 | 100 MB | | 4.88 GB | Overload |

A method of reducing the data-writing load in case that the control section has predicted that the flash memory 13 will be in the data-writing overload state using the above technique, is described now. Here, assuming that the image input device 14 includes a scanner, an example of the method of reducing data-writing load of the flash memory 13 will be described.

Figure 10A:
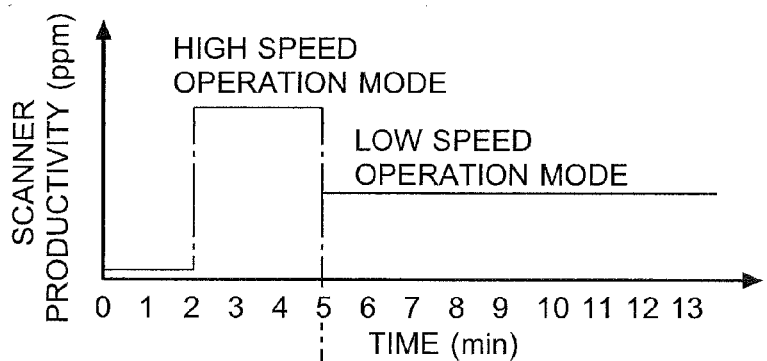
FIGS. 10A, 10B, and 10C depict an example of a control to reduce the data-writing load of the flash memory according to an example of one or more embodiments of the present invention.
Figure 10B:
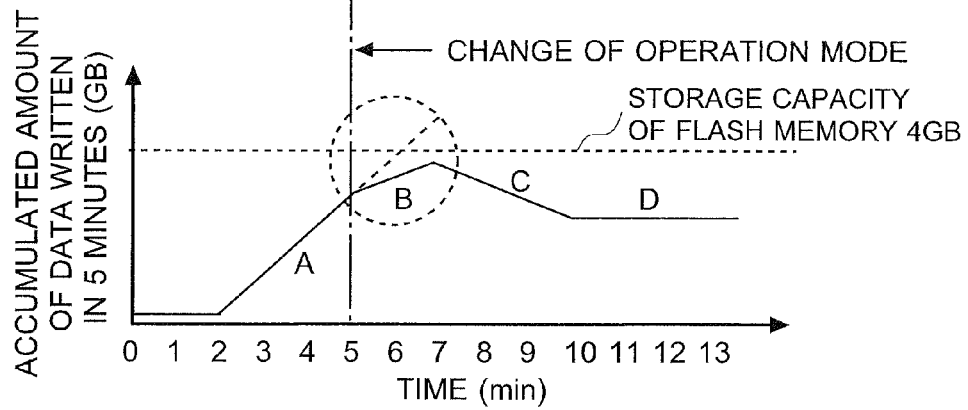

As illustrated in FIG. 10A, the control section of the image formation apparatus operates the scanner in high speed operation mode and causes the scanner to carry out continual data reading, to perform a control of continual buffering of image data. For performing such a control, the control section uses the above-described first prediction method or the second prediction method and calculates the accumulated amount of data to be written into the flash memory in 5 minutes. Then, as illustrated in FIG. 10B, in response to predicting that the accumulated amount of written data will exceed the storage capacity of the flash memory (i.e., a data-writing overload state will occur), the control section decreases the scanner productivity (image input speed) and reduces the data-writing load of the flash memory, by switching the operation mode of the scanner to a low speed operation mode. Thus, an occurrence of the data-writing overload state is avoided.

It should be noted that, with respect to the timing of change of the scanner productivity (here, an operation mode), the control section may set a threshold (of time) properly on the basis of the scanner productivity in the high speed operation mode and that in the low speed operation mode, and may perform a switching control of the scanner productivity at the time when the elapsed time from the start of the data buffering exceeds the threshold. For example, threshold $T_{th}$ (in minutes) in the example of FIG. 10A to 10C can be calculated by using the following expressions (1), under the assumption that the scanner productivity in the high speed operation mode is H (ppm), the scanner productivity in low speed operation mode is L (ppm), the capacity of the flash memory is C (GB), the interval of data writing necessary to maintain the sufficient data retention period is T (minutes), and the size of image data is S (MB).

$$((H \times T_{th} \times S) + (L \times (T - T_{th}) \times S))/1024 < C$$

$$T_{th} < (1024 \times (C-L) \times T \times S)/((H-L) \times S) \qquad (1)$$

As described above, an occurrence of the data-writing overload state can be avoided by setting the threshold $T_{th}$ according to the above-described expressions (1) and switching the scanner productivity at the time when the elapsed time from the start of the data buffering exceeds threshold $T_{th}$.

This will be described using specific numerical values. FIG. 10B shows a situation where data is written into the flash memory at a rate of 4.88 GB per 5 minutes (refer to "A" in FIG. 10B). If data writing at this rate continues, the accumulated amount of written data will exceed the storage capacity of the flash memory 13 in about 4 minutes (4 GB/4.88 GB×5 minutes) after the start of data writing. FIG. 10B further shows situations (refer to "B", "C", and "D" in FIG. 10B) where data is written at a rate of 2.44 GB per 5 minutes after an elapse of 3 minutes, which is a threshold, from the start of data writing (after minute 5 in FIG. 10B). Data is written at a rate of 2.44 GB per 5 minutes from the elapse of 3 minutes to an elapse of 5 minutes from the start of the data writing (from minute 5 to minute 7 in FIG. 10B). The accumulated amount of written data in 5 minutes after the start of the writing is about 3.9 GB, which is no greater than 4 GB (refer to "B" in FIG. 10B), where the storage capacity of the flash memory 13 is 4 GB. Data is written at a rate of 2.44 GB per 5 minutes from the elapse of 5 minutes to an elapse of 8 minutes from the start of the data writing (from minute 7 to minute 10 in FIG. 10B). At this time, the interval of the data writing of the block or blocks to which data was written in the situation "A" exceeds the recommended writing interval and the accumulated amount of written data decreases at a rate of 4.88 GB per 5 minutes. Thus, the accumulated amount of written data decreases at a rate of 2.44 GB per 5 minutes (refer to "C" in FIG. 10B) in total. Data is written at a rate of 2.44 GB per 5 minutes into all the blocks after an elapse of 8 minutes from the start of the data writing (after minute 10 in FIG. 10B). Thus, the accumulated amount of written data takes a fixed value of 2.44 GB per 5 minutes (refer to "D" in FIG. 10B).

Figure 10C:
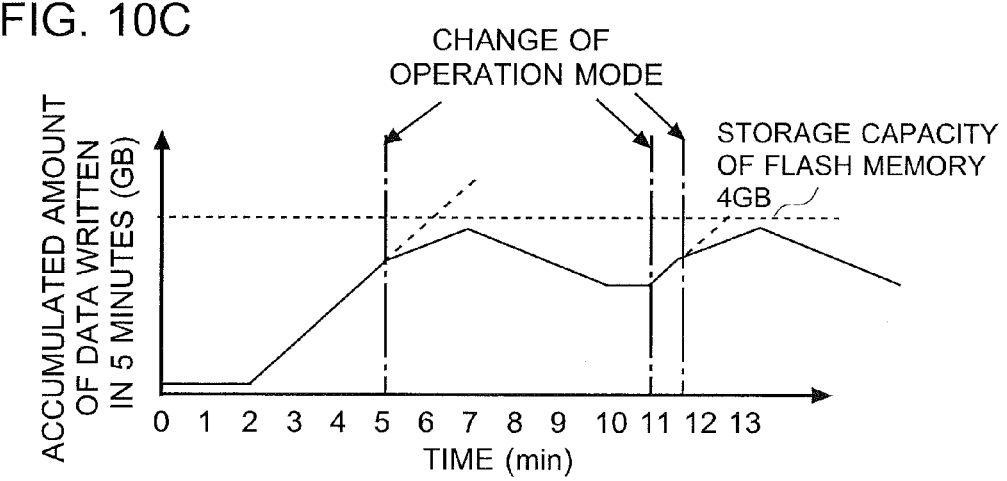

In FIG. 10B, the low speed operation mode continues after the control section switches the operation mode of the scanner after an elapse of the threshold. However, if changing the operation mode to the low speed operation mode makes the accumulated amount of written data in 5 minutes a sufficiently small value, the control section may, for example, change the operation mode to the original high speed operation mode at a time when the accumulated amount of written data in 5 minutes is in a stabilized state, and repeat the change of the operation mode, as shown in FIG. 10C.

In addition, in FIG. 10B, the control section obtains the threshold time and switches the operation mode of the scanner after an elapse of the threshold time (that is, the control section predicts an occurrence of the data-writing overload state on the basis of the elapsed period of time from the start of the data writing). Alternatively, the control section may switch the operation mode of the scanner on the basis of the threshold storage capacity which is smaller than the storage capacity of the flash memory 13 at the time of the accumulated amount of written data in 5 minutes exceeds the threshold storage capacity (that is, the control section predicts an occurrence of the data-writing overload state on the basis of the storage capacity), as follows.

Figure 11A:
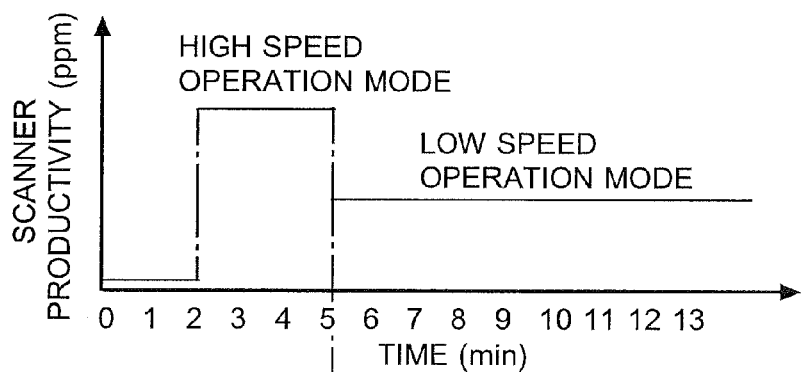
FIGS. 11A, 11B, and 11C depict another example of a control to reduce the data-writing load of the flash memory according to an example of one or more embodiments of the present invention.
Figure 11B:
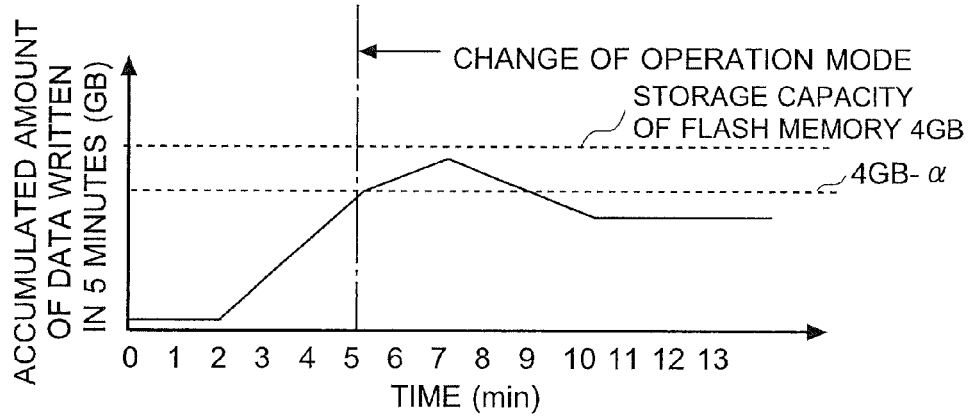
Figure 11C:
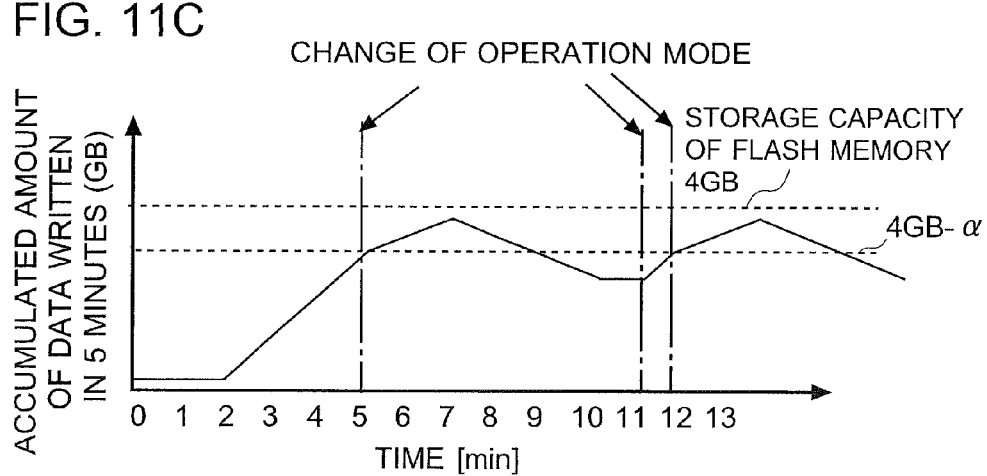

For example, it is assumed that as shown in FIG. 11A, the control section operates the scanner in a high speed operation mode to cause the scanner to carry out continuous reading of image data. When performing a control of buffering image data intermittently, the control section calculates the accumulated amount of written data in 5 minutes. As shown in FIG. 11B, the control section may set a value obtained by subtracting a from the storage capacity 4 GB of the flash memory 13 as the threshold storage capacity, and may change the operation mode of the scanner at a time when the accumulated amount of written data exceeds the threshold storage capacity. Similarly to the above, as shown in FIG. 11C, the control section may change the operation mode to the original high speed operation mode at the time when the accumulated amount of written data in 5 minutes is in a stabilized state (or when the accumulated amount of written data becomes not greater than a second threshold storage capacity, which is smaller than the above-described threshold storage capacity) and may repeat the processes of the change of the operation mode.

In FIGS. 10A, 10B, and 10C and FIGS. 11A, 11B, and 11C, the control section changes the operation mode of the scanner in order to avoid an occurrence of the data-writing overload state of the flash memory. Alternatively, the control section may, for example, reduce only the scan resolution, reduce only the scan speed, increase the scan interval (time until the start of a next scan); reduce the number of colors of image data (e.g., reduction of color from 16.77 million colors to 256 colors), change the color mode of image data (e.g., from color to monochrome) in the image input device 14 or the image processing device 15; or combine them, in order to avoid an occurrence of the data-writing overload state of the flash memory.

Further, the control section may control operations of the mechanical unit of the image output device 16, instead of operations of the mechanical unit of the image input device 14, or together with operations of the mechanical unit of the image input device 14. For example, the control section may reduce the output (print) speed or increase the output (print) interval of time (time until starting to print a next page) by changing the operation mode of the image output device 16, to restrict the speed of buffering image data Alternatively, the control section may restrict the buffering of image data itself by postponing the timing to cause the CPU 11 to read the image data from the main memory 12, the timing to cause the CPU 11 to write the image data into the flash memory 13, or the timing to cause the CPU 11 to read the image data from the flash memory 13.

Hereafter, the writing load reduction control in the image formation apparatus of the present example will be described with reference to the flowchart in FIG. 12. The CPU 11 executes processes shown in the flowchart in FIG. 12 by executing a program (control program of a flash memory) stored in the flash memory 13. It should be noted that, in FIG. 12, the writing load reduction control is performed on the basis of the threshold time ($T_{th}$) in the example of FIGS. 10A to 10C.

When the image input device 14 starts image data input (S101), the control section starts data buffering (S102). For example, the image input device 14 (scanner) obtains image data in a high speed operation mode and outputs the image data thus obtained to the image processing device 15. After performing a predetermined image processing, the image processing device 15 stores the image data thus processed into the main memory 12. Then, the CPU 11 writes the image data stored in the main memory 12 into a certain block of the flash memory 13. In so doing, the flash memory 13 writes the image data into itself using a wear leveling function. Thereafter, when the image output device 16 is ready to receive data, the CPU 11 sequentially reads the image data from the flash memory 13 and outputs it to the image output device 16, and the image output device 16 (print engine) starts image data output (S103).

Next, the CPU 11 calculates the accumulated amount of data written in a predetermined period of time (recommended writing interval) with the first prediction method or the second prediction method described above. Then, by determining whether or not the accumulated amount of written data will exceed a predetermined value (the storage capacity of the flash memory 13), the CPU 11 predicts an occurrence of a data-writing overload state of the flash memory 13 (S 104).

If the data-writing overload state is not expected, it is not necessary to perform writing load reduction control. Accordingly, the process skips to S107. If the data-writing overload state is expected, the CPU 11 determines whether or not the predetermined period (above-described threshold $T_{th}$) has passed from the start of the data buffering (S105). If the predetermined period has not passed from the start of the data buffering, it is not necessary to perform the writing load reduction control, and thus the process skips to S107.

Meanwhile, if the predetermined period has passed from the start of the data buffering, continuing the data writing into the flash memory 13 as it is will result in a shortened data writing interval in any one of the blocks in comparison with the recommended writing interval and in a shortened data retention period of that block. Accordingly, the CPU 11 performs a control to reduce the data-writing load (S106). Concretely, the CPU 11 changes the operation mode of the scanner to a low speed operation mode, lowers the scan resolution, decreases the scan speed, increases the scan interval, reduces the number of colors of image data, changes the color mode of image data, makes the print speed slower, increases the print interval of time, or reduces the buffering speed of the image data.

Thereafter, the CPU 11 determines whether or not the image data input has been completed (S107). If the image data input is not completed, the process returns to S105 to repeat the same processing. If the image data input has been completed, the CPU 11 ends data buffering (S108) and the image output device 16 ends image output (S109).

In the above description, the CPU 11 (control section) calculates the accumulated amount of written data on the basis of the amount of image data input into the flash memory. However, a NAND type flash memory has characteristics to read/write a page of data at a time and to erase a block of data at a time, which are restrictions coming from the device structure. As a result of these restrictions, the size of data actually written into the flash memory becomes larger than the size of data input data into the flash memory. Accordingly, upon calculating the accumulated amount of data written in the predetermined period, the control section uses the size of data actually written into the flash memory instead of the size of data input into the flash memory. Thereby, the control section can predict an occurrence of the data-writing overload state more accurately.

Specifically, a W/A (Write Amplification) factor is known as an index indicating how much the amount of data written inside the flash memory becomes larger in relation to the amount of data written from the outside (host controller in FIG. 13) into the flash memory. For example, as shown in FIG. 13, assuming that the size of data written from the outside (host controller in FIG. 13) into the flash memory is 4 KB and the size of data actually written inside the flash memory (data written into a NAND flash by a NAND controller in FIG. 13) in response to the data writing from the outside is 160 KB, the W/A factor is given as 160 KB/4 KB=40.

As shown in the measurement result in FIG. 14, the W/A factor decreases as the size of data written from the outside becomes larger, and increases as the size of data written from the outside becomes smaller. That is, when the size of data written from the outside is restricted to a small size, the size of data written inside the flash memory increases with respect to the size of data written from the outside. If the data transfer size on an external bus is made larger, there is substantially no difference between the size of data written from the outside and the size of data written inside the flash memory.

Accordingly, the control section uses this index to calculate the accumulated amount of written data in the first and second prediction methods that predict the data-writing overload state in the data buffering. That is, the control section obtains the W/A factor in advance to the prediction of the data-writing overload state, and if a value obtained by multiplying the accumulated amount of data written in a predetermined period by the W/A factor exceeds the storage capacity of the flash memory 13, the control section can predict that the flash memory 13 will become in the data-writing overload state.

As described above, there is provided an image formation apparatus 10 which uses a flash memory 13 as a buffer memory of image data, and when buffering input image data, the image formation apparatus 10 performs a control to reduce data-writing load of the flash memory 13, including restriction of image data input or of obtaining image data. That is, the control section of the image formation apparatus 10 predicts, on buffering input image data, whether or not the accumulated amount of data to be written into the flash memory 13 (e.g., the amount of written data defined in consideration of the W/A factor) in a predetermined period of time (an interval of data writing necessary to maintain a sufficient data retention period) will exceed a predetermined value (the storage capacity of the flash memory 13). On predicting that the accumulated amount of the data will exceed the predetermined period, the control section performs the control to reduce the data-writing load of the flash memory 13 by restricting of input (obtaining) of image data and/or a buffering speed of input image data (for example, by changing an operation mode of the image input device and/or an operation mode of the image output device). With this control, deterioration of the gate insulating film can be suppressed, the data retention period of each block of the flash memory 13 can be improved, and the life of the flash memory 13 can be prolonged.

It should be noted that the present invention is not limited to the above-described embodiments and examples. Unless deviating from the spirit of the present invention, the structure of the apparatus including the flash memory or the method of controlling the flash memory can be modified as appropriate. For example, in the above-described example, a method of monitoring the data bus and a method of using the operation mode of the image input are described as examples of the method of predicting an occurrence of a data-writing overload state. Alternatively, any method that can calculate an accumulated amount of data written into the flash memory can be used. In addition, in the above-described example, there were given descriptions that the control section switches the high speed operation mode and the low speed operation mode of the image input device or the image output device as an example of the control to reduce the data-writing load of the flash memory. However, the control section of the image formation apparatus may perform any control that can restrict the data input and/or data buffering.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image formation apparatus comprising:
   an image input device;
   an image output device;
   a flash memory to be used as an image data buffer, the flash memory comprising a plurality of memory blocks, where data writing to each of the memory blocks is controlled by using wear leveling; and
   a control section that controls the flash memory to level wear in the flash memory and performs processes comprising:
   based on at least one of an input of an image data and a speed of buffering the image data to the flash memory, predicting whether or not writing of a certain amount of image data such that the amount of image data to be written into the flash memory in a predetermined interval of time exceeds a predetermined value, will occur, wherein the predetermined interval of time is an interval of data writing between a start time and an end time, the end time occurring after the start time, and
   on predicting that the writing of the certain amount of image data will occur, by restricting the at least one of the input of image data and the speed of buffering the image data to the flash memory, reducing the amount of image data to be written into the flash memory in the predetermined interval of time to the predetermined value or less and making an interval of the data writing to each of the memory blocks greater than or equal to the predetermined interval of time.

2. The image formation apparatus of claim 1, wherein the control section changes at least one of an operation mode of the image input device and an operation mode of the image output device, so as to restrict at least one of the input of image data and the speed of buffering the image data to the flash memory.

3. The image formation apparatus of claim 2, wherein
   the image input device comprises a scanner, and
   the control section instructs the image input device to at least one of reduce a scan resolution, reduce a scan speed, and increase a scan interval, so as to restrict the input of image data.

4. The image formation apparatus of claim 2, wherein
   the image output device comprises a print engine, and
   the control section instructs the image output device to at least one of reduce a print speed and increase a print interval of time, so as to restrict the speed of buffering the image data to the flash memory.

5. The image formation apparatus of claim 1, wherein
   the predetermined interval of time is an interval of data writing to the flash memory determined so as to increase a data retention period of each of the memory blocks of the flash memory to a certain period of time or more, and
   the control section maintains the interval of data writing and restricts a reduction of the data retention period of each of the memory blocks, by reducing the amount of image data to be written into the flash memory in the predetermined interval of time to the predetermined value or less.

6. The image formation apparatus of claim 5, wherein the certain period of time is a life of the image formation apparatus.

7. The image formation apparatus of claim 1, wherein the predetermined value is a storage capacity of the flash memory.

8. The image formation apparatus of claim 1, wherein the control section:
   obtains a write amplification factor in advance, the write amplification factor representing a ratio of an amount of data written inside the flash memory in relation to an amount of data written from an outside into the flash memory, and
   predicts whether or not writing of a certain amount of image data such that the amount of image data to be written to the flash memory in the predetermined interval of time exceeds the predetermined value, will occur inside the flash memory, while referring to the write amplification factor.

9. A method of controlling a flash memory used as an image data buffer in an image formation apparatus, the flash memory comprising a plurality of memory blocks, where data writing to each of the memory blocks is controlled by using wear leveling, the method comprising:
   based on at least one of an input image data and a speed of buffering the image data to the flash memory, predicting whether or not writing of a certain amount of image data such that the amount of image data to be written into the flash memory in a predetermined interval of time exceeds a predetermined value, will occur, wherein the predetermined interval of time is an interval of data writing between a start time and an end time, the end time occurring after the start time; and
   on predicting that the writing of the certain amount of image data will occur, by restricting the at least one of the input of image data and the speed of buffering the image data to the flash memory, reducing the amount of image data to be written into the flash memory in the predetermined interval of time to the predetermined value or less and making an interval of the data writing to each of the memory blocks greater than or equal to the predetermined interval of time,
   wherein the image formation apparatus further comprises an image input device and an image output device.

10. The method of claim 9, wherein
    the restricting of at least one of the input of image data and the speed of buffering the image data to the flash memory, comprises changing at least one of an operation mode of the image input device and an operation mode of the image output device, so as to restrict at least one of the input of image data and the speed of buffering the image data to the flash memory.

11. The method of claim 10, wherein
    the image input device comprises a scanner, and
    the restricting of at least one of the input of image data and the speed of buffering the image data to the flash memory comprises instructing the image input device to at least one of reduce a scan resolution, reduce a scan speed, and increase a scan interval, so as to restrict the input of image data.

12. The method of claim 10, wherein
    the image output device comprises a print engine, and
    the restricting of at least one of the input of image data and the speed of buffering the image data to the flash memory comprises instructing the image output device to at least one of reduce a print speed and increase a print interval of time, so as to restrict the speed of buffering the image data to the flash memory.

13. The method of claim 9, wherein
    the predetermined interval of time is an interval of data writing to the flash memory determined so as to increase a data retention period of each of the memory blocks of the flash memory to a certain period of time or more, and the restricting of at least one of the input of image data and the speed of buffering the image data to the flash memory comprises maintaining the interval of data writing and restricts a reduction of the data retention period of each of the memory blocks, by reducing the amount of image data to be written into the flash memory in the predetermined interval of time to the predetermined value or less.

14. The method of claim 13, wherein the certain period of time is a life of the image formation apparatus.

15. The method of claim 9, wherein the predetermined value is a storage capacity of the flash memory.

16. The method of claim 9, wherein the predicting whether or not the writing of the certain amount of image data will occur, comprises:
   obtaining a write amplification factor in advance, the write amplification factor representing a ratio of an amount of data written inside the flash memory in relation to an amount of data written from an outside into the flash memory, and
   predicting whether or not writing of a certain amount of image data such that the amount of image data to be written to the flash memory in the predetermined interval of time exceeds the predetermined value, will occur inside the flash memory, while referring to the write amplification factor.

17. A non-transitory computer-readable storage medium storing a control program for performing the method of claim 9, wherein the control program is executed by a processor of the image formation apparatus.

18. The non-transitory computer-readable storage medium of claim 17, wherein
   the restricting of at least one of the input of image data and the speed of buffering the image data to the flash memory comprises changing at least one of an operation mode of the image input device and an operation mode of the image output device, so as to restrict at least one of the input of image data and the speed of buffering the image data to the flash memory.

19. The non-transitory computer-readable storage medium of claim 18, wherein
   the image input device comprises a scanner, and
   the restricting of at least one of the input of image data and the speed of buffering the image data to the flash memory comprises instructing the image input device to at least one of reduce a scan resolution, reduce a scan speed, and increase a scan interval, so as to restrict the input of image data.

20. The non-transitory computer-readable storage medium of claim 18, wherein
   the image output device comprises a print engine, and
   the restricting of at least one of the input of image data and the speed of buffering the image data to the flash memory comprises instructing the image output device to at least one of reduce a print speed and increase a print interval of time, so as to restrict the speed of buffering the image data to the flash memory.

21. An image formation apparatus comprising:
   an image input device;
   an image output device;
   a flash memory used as an image data buffer, the flash memory comprising a plurality of memory blocks, where data writing to each of the memory blocks is controlled by using wear leveling; and
   a control section that controls the flash memory to level wear in the flash memory and performs processes comprising:
      based on at least one of an input of an image data and a speed of buffering the image data to the flash memory, predicting whether or not writing of a certain amount of image data such that the amount of image data to be written into the flash memory in a predetermined interval of time exceeds a predetermined value, will occur, wherein the predetermined interval of time is an interval of data writing between a start time and an end time, the end time occurring after the start time, and
   on predicting that the writing of the certain amount of image data will occur, restricting the speed of buffering the image data to the flash memory, to reduce the amount of image data to be written into the flash memory in the predetermined interval of time to the predetermined value or less.

* * * * *